United States Patent [19]

Takematsu

[11] 4,385,347
[45] May 24, 1983

[54] POWER SUPPLY

[76] Inventor: Yoshiyuki Takematsu, 38-1 Komaba 1 Chome, Meguro-ku, Tokyo, Japan

[21] Appl. No.: 175,777

[22] Filed: Aug. 6, 1980

Related U.S. Application Data

[62] Division of Ser. No. 2,890, Jan. 12, 1979, abandoned.

[30] Foreign Application Priority Data

Jan. 17, 1978 [JP] Japan ................................ 53-3504
Jan. 30, 1978 [JP] Japan ................................ 53-9154

[51] Int. Cl.$^3$ ............................................. H02M 3/335
[52] U.S. Cl. .................................... 363/49; 363/18
[58] Field of Search ............................ 363/18-21, 363/49, 124, 131; 315/241 P, 243, 225, DIG. 5, DIG. 7; 331/112, 113 R, 116 R, 117 R; 320/1

[56] References Cited

U.S. PATENT DOCUMENTS

| | | | |
|---|---|---|---|
| 2,920,259 | 1/1960 | Light ........................... | 363/18 |
| 3,310,723 | 3/1967 | Schmidt et al. ............ | 363/18 X |
| 3,555,396 | 1/1971 | Kalman ...................... | 363/49 X |
| 3,624,484 | 11/1971 | Colyer ....................... | 363/18 |
| 3,743,918 | 7/1973 | Maitre ....................... | 363/131 |
| 3,764,849 | 10/1973 | Ohta .......................... | 315/241 P |
| 3,831,079 | 8/1974 | Iwata ......................... | 315/241 P |
| 4,039,898 | 8/1977 | Iwata et al. ............... | 315/241 P |

Primary Examiner—William M. Shoop
Assistant Examiner—Peter S. Wong
Attorney, Agent, or Firm—Fleit, Jacobson & Cohn

[57] ABSTRACT

This invention concerns a power supply arrangement which comprises a direct current power source circuit (A) including a battery (10), a voltage converter circuit (B) including an oscillator circuit (OC), an oscillating transformer (11) and an oscillation starting circuit (OS), a rectifier circuit (C) for rectifying said alternating current voltage to a direct current, and an oscillation stopping means (F) for stopping the current supplied from said battery to a load circuit member (D). The oscillator circuit (OC) includes an oscillating switching element (12) which has a high leak resistance, and the oscillation starting circuit includes a switch element (15) for starting the actuation of said voltage converter. In accordance with the power supply arrangement of the present invention, a power source switch is not required because the oscillator circuit is activated by supplying a momentary oscillation starting signal and because the voltage converter becomes deactivated by supplying a momentary oscillation stopping signal.

23 Claims, 10 Drawing Figures

POWER SUPPLY

This is a continuation of application Ser. No. 002,890, filed Jan. 12, 1979, now abandoned.

FIELD OF THE INVENTION

The present invention relates to a power supply arrangement for a direct current load with a feed-back control, and particularly to a battery operated power supply arrangement using a DC-DC converter having a oscillator circuit and a low, stand-by drain. The power supply arrangement of the present invention is particularly useful for an operating a direct-current load such as, for example, an electric photoflash equipment.

BACKGROUND OF THE INVENTION

In a battery operated power supply, a DC-DC converter is, generally, employed in order to regulate a voltage from a battery.

Particularly, electric flash units employ a power supply usually wherein a large output capacitor is charged, over a period of time, to a voltage of sufficient amplitude to supply a photoflach lamp. These power supply usually employ a mechanical vibrator for the purpose of converting a relatively low battery voltage to the relatively high undirectional voltage required for a load such as, for example, the photoflash lamp. Since it is customary to ready an electric flash unit by energing it before a photographic picture is to be taken, the output capacitor of the unit is energized continuously until the voltage across it is applied to the photoflash lamp. The drain on the batteries during this stand-by operation may be considerable, and reduces the battery life. Also, the light available from the photoflash lamp decreases as the output voltage of the battery source decreases.

The power supply of this kind of the load employs a DC-DC converter which comprises a direct current power source circuit having a battery, a voltage converter circuit for converting a direct current voltage into an alternating current voltage, a rectifier circuit for rectifying the alternating current voltage to a direct current voltage.

The direct current power source circuit usually includes a power source switch which is manually operated to switch on and off a current from the battery. The voltage converter circuit is connected to the battery by way of the power source switch. An oscillator circuit is usually employed in the voltage converter circuit for obtaining an oscillation output voltage, and the direct current voltage is obtained by means of rectifying the oscillation voltage by the rectifier circuit.

This type of DC-DC converter is, generally, used in order to obtained the direct current voltage to be regulated in response to the load. Accordingly, it is necessary to invert the direct current voltage to the alternating current voltage in order to boost or drop the output voltage of the power supply. To this end, it is convenience to use substantially an oscillating transformer, a resistor, an oscillating capacitor and an oscillation switching element.

In an usual power supply, a toggle type switch or a slide switch is used as a power source switch, and therefore the power source switch continues an ON state or an OFF state, because it is manually operated. The voltage converter circuit tries to continues its operation so long as the power source switch is not turned OFF. Accordingly, if the power source switch is left in its conductive condition for a long time interval, the voltage converter circuit continues an activation so as to supply the power to the load, and, therefore, the current from the battery flows until the power source switch is opened.

During this time the power supply consumes energy from the battery without any useful result. As the battery ages its output voltage drops and the battery becomes incapable of operating.

One known method of revolving the above drawbacks, is embodied a power supply in which a timer circuit is provided between a power source circuit and a voltage converter circuit in order to interrupt the current which flows from the power source circuit, if the power supply is unnecessary to use within a given time period. The timer circuit, however, includes a semiconductive element, such as, for example, a power transistor which is serially connected to the power source circuit and the voltage converter circuit, and, as a result, the actual power input to the voltage converter circuit B is reduced due to the high and specific power loss of the power transistor. Accordingly, the above described method does not effective use of the battery.

OBJECT OF THE INVENTION

The primary object of the present invention is to provide an improved battery operated power supply arrangement which overcomes the above drawbacks, namely, a power supply arrangement in which high performance is obtained and the cost is reduced.

More specifically, an object of the present invention is to provide an economical and high performance power supply arrangement which consumes a small amount of electrical energy in the stand-by condition while maintaining an electrical energy to supply to a load circuit, by interrupting current from a battery automatically or forcedly, and is easy to construct and to operate, and is highly efficient in use.

SUMMARY OF THE INVENTION

These object and related advantage of the present invention are attained in an improved power supply wherein the voltage from a power source of relatively low battery voltage is converted to a relatively high unidirectional output voltage to be supplied to a load. The battery voltage is applied to a transistor oscillator circuit. A suitable bias voltage is applied to a control electrode of the transistor of the oscillator circuit, through a switch, to cause the oscillator circuit to oscillate. The output of the oscillator is rectified and applied as a unidirectional output voltage across the direct current load. The voltage across the load may be applied to a utilization circuit, such as a photoflash lamp, and the like.

According to the present invention there is provided as power supply arrangement comprising a power source circuit including a battery, a voltage converter circuit for converting a direct current voltage from said direct current power source circuit to an alternating current voltage to a direct current voltage, a rectifier circuit for rectifying said alternating current voltage to a direct current, a load circuit member, and an oscillating stopping means for stopping current supply from said battery to said load circuit member, said voltage converter circuit comprises also an oscillating transformer for generating an alternating current voltage, an oscillation circuit including an oscillating switch element having a high leakage resistance and an oscillation starting circuit including switching means operable to actuate said oscillator circuit.

BRIEF DESCRIPTION OF THE DRAWING

Certain embodiments of the invention will now be described by way of examples and with reference to the accompanying drawings, wherein like parts in each of the several figures are identified by the same reference character and wherein.

DETAILED DESCRIPTION OF EMBODIMENTS

Figure 1:
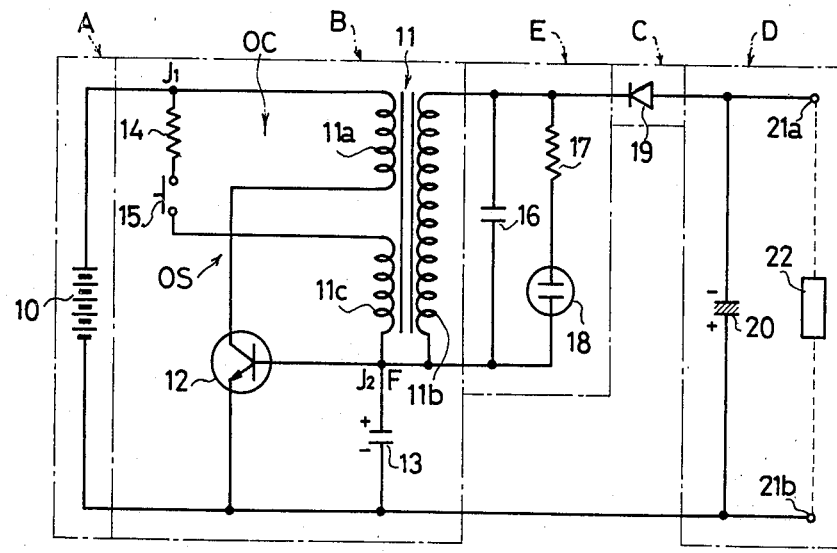
FIG. 1 is detailed circuit diagram of a power supply arrangement according to the present invention.

The power supply arrangement in FIG. 1 comprises a direct-current power source circuit A, voltage converting means which includes a voltage converter circuit B for converting and boosting the voltage from the direct-current power source circuit A into alternating current voltage, rectifying means including a rectifier circuit C for rectifying the voltage from the boosted alternating current voltage from the voltage converter circuit B, a load circuit member D such as a main storage capacitor to be powered by an output power from the rectifier circuit C, and a surge absorbing circuit E.

The direct current power source circuit A includes only a battery 10, and does not include a power source switch. The voltage converter circuit comprises, substantially, an oscillator circuit OC, and an oscillation starting circuit OS and an oscillation stopping circuit F. In more detail, the voltage converter circuit B includes an oscillating transformer 11 having a primary winding 11a, a secondary winding 11b and a third winding 11c, an oscillating capacitor 13, an oscillation switching element in the form of a high performance silicon transistor 12, a resistor 14 of which one terminal in directly connected to the positive terminal of the battery 10, and an oscillation starting switch in the form of a mechanical switch 15 of which one terminal is connected to other terminal of the resistor 14 to form the oscillation starting circuit OS. The oscillating transformer 11 consists a primary winding 11a, a secondary winding 11b and a third winding 11c. One terminal of the primary winding 11a is directly connected to the positive terminal of the battery 10, and other terminal of the primary winding 11a is connected to a collector electrode in order to form the oscillator circuit OC. One terminal of the secondary winding 11b is connected to one terminal of the third winding 11c, and other terminal of the third winding 11c is connected to the mechanical switch 15 in order to constitute the oscillation starting circuit OS.

The converter circuit B is substantially a voltage feedback type oscillator circuit. The oscillating transistor 12 is of a high performance NPN type, as is explained hereinabove and has high internal resistance when it is cut-off state. Accordingly, the leakage current of the transistor 12 is extremely small and is almost zero in comparison with that of the Gerumanium transistor. It is, therefore, unnecessary to provide the power source switch in the power source circuit A.

The rectifier circuit C includes an electric valve in the form of a diode 19 of which the cathode is connected to the other terminal of the secondary winding 11b of the transformer 11, and the diode is provided so as to be reverse direction with respect to the polarity of the battery 10. The load circuit member D includes a main storage capacitor 20 and a load circuit 22. One terminal of the capacitor 20 is connected to an emitter electrode of the transistor 12 and to the negative terminal of the battery 10.

The surge absorbing circuit E comprises a capacitor 16 which is connected to the secondary winding 11b of the transformer 11, a current restricting resistor 17 and an indicating lamp in the form of a neon glow lamp 18 which is connected the capacitor 16 in parallel by way of the current restricting resistor 17.

The oscillation starting circuit OS is comprised by the resistor 14, the oscillation starting switch 15 which is made on state by means of manually pushing and has a normal open switch which is made off by releasing the pushing thereof. The oscillating transistor 12 is a high performance NPN type sillicon transistor in which the leakage current is small such as, for example, in the order of 0.1-0.2 $\mu$A or nearly zero. A charging voltage of the main storage capacitor 20 is applied to the load 22 which is connected between output terminals 21a and 21b. The load 22 is substituted by an electric flash tube of the electric flash device and the like. The charged voltage on the main storage capacitor 20 is supplied to a discharging circuit (not shown in the drawing) of an electric flash device.

In operation, the switch 15 is manually actuated by its ON and OFF starter. When the switch 15 is in its OFF state, the oscillator circuit OC does not initially activated its oscillating operation, because the transistor 12 is non-conductive. By turning the switch 15 instantaneously ON, the base electrode of the transistor 12 is biased to cause the transistor 12 to become conductive, because the base current is supplied to the transistor 12 from the battery 10 of the power source circuit A by way of the resistor 14, the switch 15 and the third winding 11c of the oscillating transformer 11. When the transistor 12 turns on, current flow through the primary winding 11a of the oscillating transformer 11, the collector-emitter path of the transistor 12 from the battery 10, and, at the same time, the current flows through the third winding 11c, the base-emitter electrodes of the transistor 12, the battery 10 and the resistor 14, and the electric charge is accumulated on the capacitor 13 at the polarity as shown in FIG. 1 and thereby the voltage converter circuit B commences the oscillation and produces high alternating current voltage from the secondary winding 11b. In this case, the oscillating voltage due to the stray capacity of the windings of the transformer 11 or the oscillating capacitor 13 is also employed to make the oscillating transistor 12 ON and OFF operation. The high alternating current voltage is rectified by the diode 19 of the rectifier circuit C, to produce a high direct current voltage. The main storage capacitor 20 of the load circuit member D is charged by the high D.C. voltage from the rectifier circuit C.

The oscillation starting switch 15 is constructed so as to be made off state immediately after its ON operation is completed, and, therefore, although the current is only momentary supplied to the base circuitry of the transistor 12 from the battery 10, the oscillating operation of the oscillator circuit OC is continued because the electromagnetic connection in the transformer 11 is performed owing to the distinguishing of the energy stored in the inductance of the transformer 11 and the current required to the oscillation flows into the base electrode of the transistor 12.

Additionally, the switch is not always required to be made OFF state immediately after ON function finishes, but may be a switch which becomes OFF state after predetermined time interval such as, for example, after three seconds. Accordingly, a contact of a timer may be used instead of the oscillation starting switch 15.

As each winding of the oscillating transformer 11 is wound so that the base current increases, the transistor 12 becomes conductive by means of positive feed-back operation. The collector current almost linearly increases with respect to time and the induced voltage in the third winding 11c. The transient component of the base current decreases, when the base current reaches a peak value which is decided by the induced voltage and the resistor 14. That is to say, the increment of the collector current becomes non-linear, and does not increase any longer. Accordingly, the induced voltage at the third winding decreases, and thereby the base current of the transistor 12 decreases, and then the collector current decreases swiftly. By the decrement of the collector current, the transistor 12 is made cut-off condition.

When the transistor 12 is nonconductive, the current flowing through the third winding 11c of the oscillating transformer 11 is swiftly interrupted and then the energy $\frac{1}{2}L_1 \times I_p^2$ stored on the oscillating capacitor 13 appears to the third winding 11c as a reverse voltage with respect to the oscillating transistor 12 and the electric charge is stored on the capacitor 13. Where $L_1$ is an inductance [H] and $I_p$ is a peak value of the collector current. The third winding 11c is used to stabilize the oscillation starting, and does not affect the oscillation after the oscillation switch 15 assumes the OFF state.

In this case, the charging current into the capacitor 13 becomes oscillating current if leaving as it is, because the transistor 12 is cut off. Under these condition, the current which flows in the primary winding 11a of the oscillating transformer 11 is also reversed at a half cycle of the oscillation of the charging current, and the voltage appears at the third winding 11c due to that current so as to forward bias the transistor 12. And, therefore, the transistor 12 is biased again to be conductive state.

The capacitor of the surge absorbing circuit E makes a reverse voltage generated at the secondary winding 11b small and compensates a signal by absorbing the surge voltage. The voltage induced on the capacitor 16 is applied to the neon glow lamp 18 through the resistor 17, and thereby the neon glow lamp 18 illuminates so that the oscillation of the oscillator circuit OC may be confirmed by the illumination of the neon glow lamp 18. The inactivation of the oscillator circuit OC may also be confirmed when the neon glow lamp 18 does not illuminate. The voltage converter circuit B can be employed as an alternating current power supply by connecting an alternating current load instead of the neon glow lamp 18 between both terminals of the secondary winding 11b of the transistor 11.

Next, the OFF operation of the voltage converter circuit B will be described specifically hereinbelow, on the bases of the experimental data. A current in the order of 50 milliampere (mA) has initially flowed through the main storage capacitor 20 by way of the diode 19, the secondary winding 11b of the transformer 11 and the base-emitter path of the transistor 12 and, at the same time, the diode 19, the capacitor 16 and the oscillating capacitor 13 when the oscillator circuit (OC) activates the oscillating operation. The current flowing through the main storage capacitor 20 gradually decreases as the electric charge is stored on the main storage capacitor 20. When the current of the capacitor 20 decreases to 150 μA, the base current of the oscillating transistor 12 is also decreases, and thereby the current of the primary winding 11a of the transformer 11 from the battery 10 is automatically interrupted by the transistor 12, because the base current of the transistor 12 decreases less than the current required for switching operation.

According to the power supply arrangement shown in FIG. 1, since the high performance transistor 12 in the oscillation starting circuit OS of the voltage converter circuit B, the loss of the battery energy is prevented even when the switch 15 is left its ON state for a long time period. Further, since the current which flows in the base circuit of the transistor 12 is small, voltage drop is eliminated even when a long lead wire is to be connected to the switch 15. It is, therefore, appreciated that good characteristics of the voltage converter circuit B are obtained.

Further, the circuit construction is simplified because the oscillator circuit OC can be operated by closing the oscillation starting switch 15 instantaneously. Accordingly, the power supply arrangement shown in FIG. 1 is easy to operate and to manufacture and is economical in comparison with the prior art power supply arrangement because a push-button switch may be employed as the oscillation starting switch 15. Furthermore, the unuseful power consumption of the battery 10 is prevented since the current from the power source circuit A is automatically interrupted after a predetermined time interval.

Figure 2:
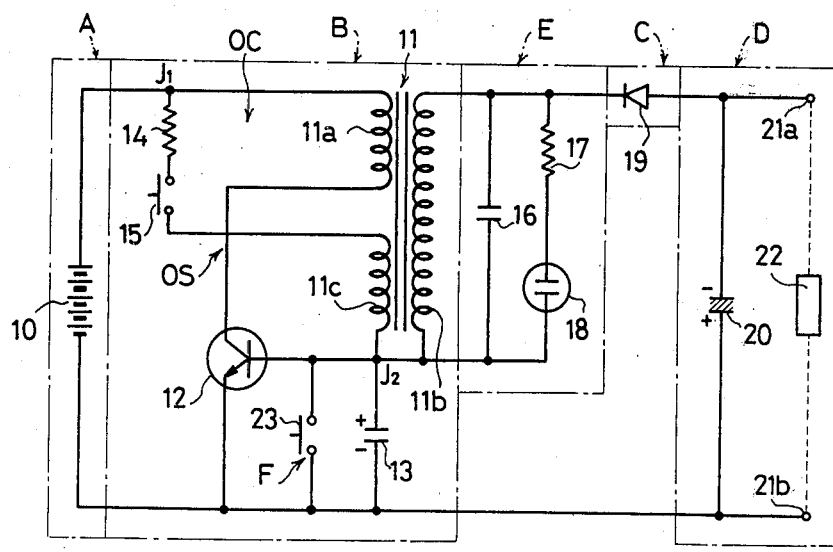
FIG. 2 is a detailed circuit diagram of another power supply arrangement according to the present invention.

FIG. 2 is illustrative of other embodiment of the present invention, and the power supply shown comprises, similar to the power supply of FIG. 1, a power source circuit A, a voltage converter circuit B, a rectifier circuit C and a load circuit member D. The only difference from the power supply arrangement of FIG. 1 is that an oscillation stopping circuit F is provided in the voltage converter circuit B and that the voltage converter circuit B is actuated and controlled by short circuitting the oscillation circuit OC in order to stop the oscillation of the oscillator circuit OC.

More specifically, in the power supply of FIG. 2, an oscillation stopping means is comprised by connecting an oscillation stopping switch in the form of a normally opened push-button switch 23 between a base electrode and an emitter electrode of an oscillating transistor 12, in order to stop the oscillation of the oscillator circuit OC.

In accordance with the power supply arrangement, when the oscillation starting switch 15 is closed, the oscillator circuit OC commences the oscillating operation, as described hereinabove. By the oscillation of the oscillator circuit OC, an alternating current voltage is induced at the secondary winding 11b of an oscillating transformer 11. The induced voltage at the secondary winding 11b is rectified by the diode 19 of the rectifier circuit C, and thereby a direct current flows in order to charge the electric charge on a main storage capacitor 20 by way of a diode 19, the secondary winding 11b of the oscillating transformer 11, a juncture $J_2$, an oscillating capacitor 13 and the main storage capacitor 20, and, at the same time, the diode 19, the secondary winding 11b, a juncture $J_2$, base-emitter path of the transistor 12 and the main storage capacitor 20. Under these conditions, although the oscillation of the oscillator circuit OC is stopped automatically as the main storage capacitor 20 is charged up, the operation of the oscillator circuit OC is positively and swiftly stopped by closing the oscillation stopping switch 23, because the oscillating capacitor 13 is short-circuitted by the switch 23. Under these conditions, the leakage current is less than several micro-ampere, and a power source switch is unnecessary in the power source circuit A.

According to the power supply arrangement of FIG. 2, the oscillating operation of the oscillator circuit OC can be stopped quickly by closing the oscillation stopping switch 23 before it is automatically stopped. In addition, the switch 23 is effective to use in a circuit in which the oscillation is not stopped automatically, particularly when an oscillating current in the oscillator circuit OC does not experience damping due to the large magnitude of the load current.

Figure 3:
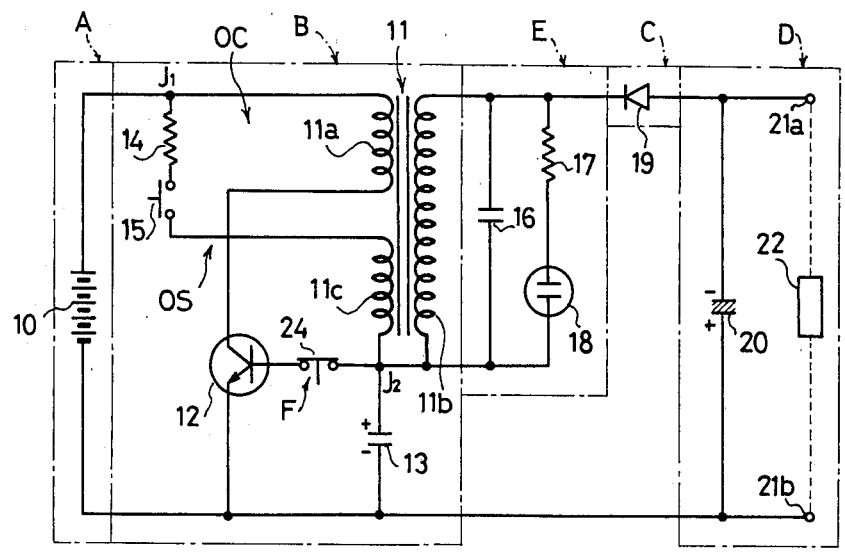
FIG. 3 shows a modification of the circuit of FIG. 2.

FIG. 3 shows an over more effective power supply according to the present invention. In the embodiment of FIG. 3, the power supply also comprises a direct-current power source circuit including a battery 10, a voltage converter circuit B, a rectifier circuit C and a load circuit member D which includes a main storage capacitor 20 and a load 22.

In the power supply arrangement of FIG. 3, an oscillation stopping circuit F includes a push-button switch 24 having a normally closed contact which is connected and interposed between a base electrode and a juncture of a feed-back winding in the form of a third winding 11c of an oscillating transformer 11.

According to the power supply arrangement of FIG. 3, when the oscillator circuit OC activates, alternating current voltages is induced at the secondary winding 11b and the third winding 11c of the oscillating transformer 11. Under these conditions, a feed-back current is supplied from the third winding 11c by way of the oscillation stopping switch 24 to the base electrode of the transistor 12, and, at the same time, the direct current is supplied to the base electrode of the transistor 12 through a diode 19, a capacitor 16 and the secondary winding 11b of the transformer 11 and the switch 24. Under these conditions, the current supplied to the base electrode of the transistor 12 is interrupted by opening the switch 24 momentarily, and thence the transistor 12 is forcibly turned off. When the transistor 12 becomes non-conductive, the current flowing through the primary winding 11a of the transformer 11 is interrupted and, therefore, the oscillation of the oscillator circuit OC is ceased.

In the power supply arrangement of FIG. 3, since the normal closed switch 24 is provided in the base circuit of the transistor 12, the oscillating operation is effectively ceased by opening the switch 24. Particularly, the switch 24 may be used to turn the oscillator circuit OC off swiftly.

Figure 4:
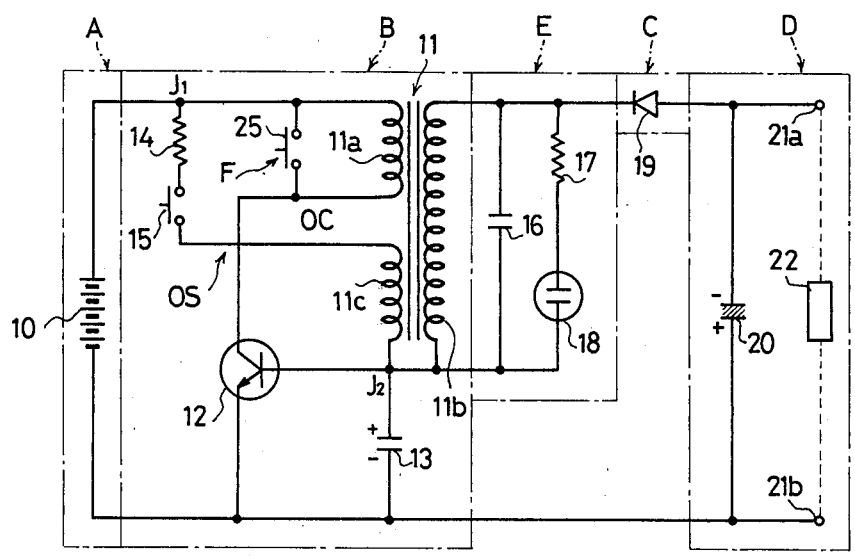
FIG. 4 is detailed circuit diagram of a power supply arrangement according to the present invention.

FIG. 4 shows a modification of the power supply arrangement of FIG. 3. In the power supply arrangement of FIG. 4, an oscillation stopping circuit F is provided in the primary side of an oscillator circuit OC. In more detail, normal open switch 25 is connected in parallel relationship with the primary winding 11a of an oscillating transformer 11.

In accordance with the power supply arrangement of FIG. 4, an oscillating current flows through the primary winding 11a of the oscillating transformer 11 and collector-emitter path of an oscillating transistor 12, by closing an oscillation starting switch 15. When the oscillation stopping switch 25 is closed, an electromagnetic coupling is distinguished between the primary winding 11a and a secondary winding 11b and a third winding 11c, and thereby the oscillating transistor 12 is turned off, and, at the same time, the oscillation is stopped. In this case, although the transistor 12 is directly connected to the battery 10 through the oscillation stopping switch 25, the power loss of the batter 10 is almost negligible, because the leakage current is approximately 0.1 $\mu$A between collector electrode and the emitter electrode.

Figure 5:
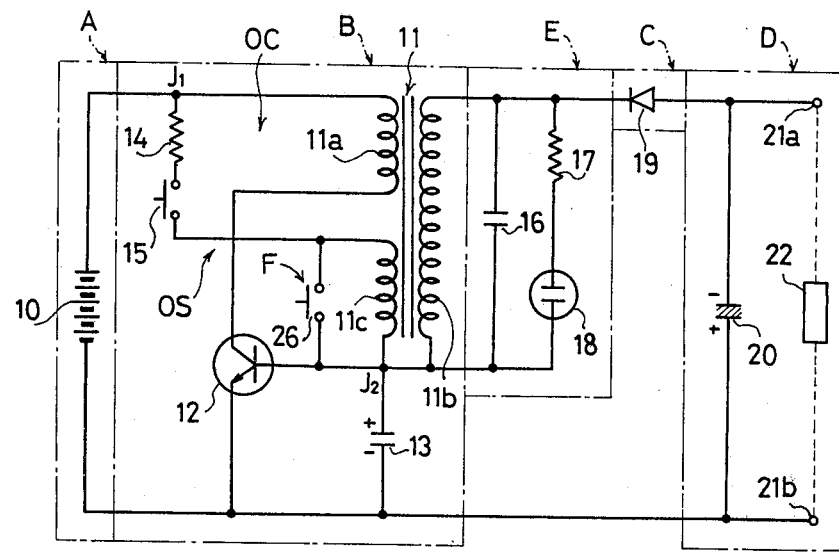
FIG. 5 shows a modification of the circuit of FIG. 4.

FIG. 5 is an illustrative of the power supply arrangement which embodies the present invention. In the embodiment of FIG. 5, the voltage converter circuit B comprises also an oscillation stopping circuit F. The oscillation stopping circuit F includes an oscillation stopping switch in the form of a normal open switch 26 which is connected to a third winding 11c as a fed-back winding. In accordance with the power supply arrangement, a feed-back voltage is not obtained in the third winding 11c of the oscillator circuit OC, and, accordingly, the operation of the oscillator circuit OC is automatically and swiftly ceased.

Figure 6:
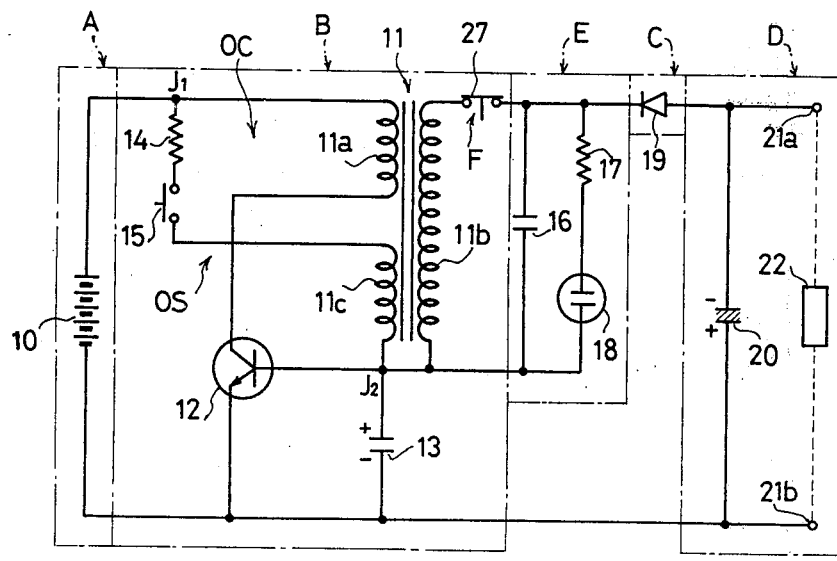
FIG. 6 is detailed circuit diagram of further power supply arrangement according to the present invention.

FIG. 6 shows a modification of the power supply arrangement in accordance with the present invention. In the power supply arrangement shown FIG. 6, an oscillation stopping circuit F is arranged in the secondary side of an oscillator circuit OC. Specifically, a normal closed switch 27 is connected between one terminal of a secondary winding 11b of an oscillating transformer 11 and one terminal of a capacitor 16.

In accordance with the power supply arrangement of FIG. 6, an oscillating output is interrupted by means of opening the switch 27, and thereby the feed-back current supplied to a base electrode from a third winding 11c is interrupted, and, as a result, the oscillation of the oscillator circuit OC is forcedly stopped.

Figure 7:
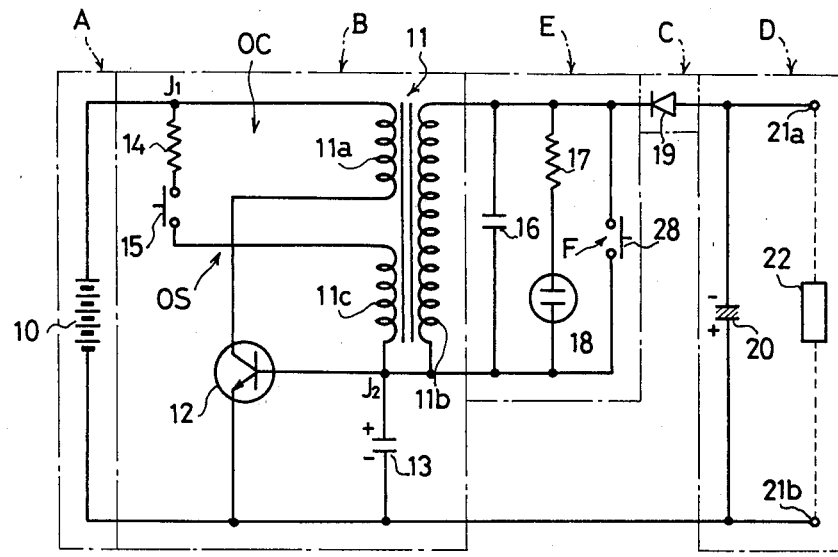
FIG. 7 shows a modification of the circuit of FIG. 6.

FIG. 7 is a modification of the power supply arrangement of FIG. 6. In the power supply arrangement of FIG. 7, an oscillation stopping circuit F comprises a normal open switch 28 which is connected to a capacitor 16 and a series circuit of a current-restricting resistor 17 and a neon glow lamp 18 in parallel relationship.

By closing the switch 28, the secondary winding 11b is short-circuited and a feed-back voltage in a third winding 11c disappears, and the oscillation of the oscillator circuit OC is stopped, because an oscillating transistor 12 becomes nonconductive owing to the interruption of the feed-back current from the third winding 11c of the transformer 11 to a base electrode of the transistor 12. Additionally, a resistor having a high resistance value may be connected in series with the switch 28, if required.

Figure 8:
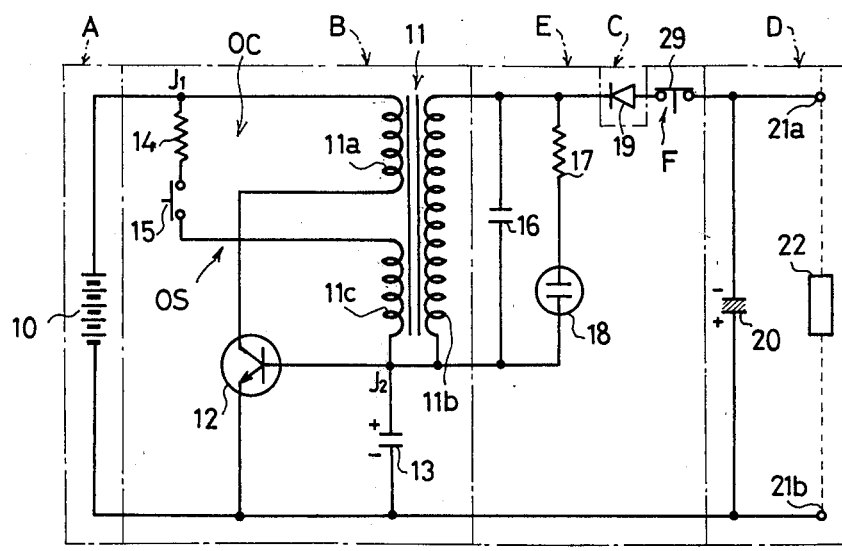
FIG. 8 is detailed circuit diagram of yet another power supply arrangement according to the present invention.
Figure 9:
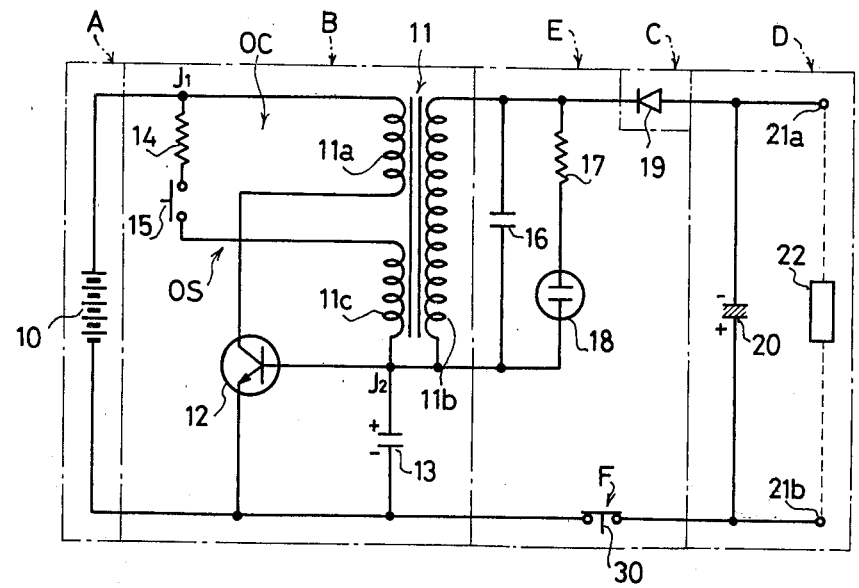
FIG. 9 shows a modification of the circuit of FIG. 9.

FIGS. 8 and 9 are illustrative of further embodiments of the present invention, and the power supply arrangements shown comprise a power source circuit A, a voltage converter circuit B, a rectifier circuit C, a load member D and an oscillation stopping circuit F. In accordance with the power supply arrangement of FIG. 8, a oscillation stopping switch 29 is interconnected between the rectifier circuit C and the load circuit member D. More specifically, a normal closed switch 29 is connected between an anode electrode of a diode 19 and one terminal of a main storage capacitor 20.

In operation, when the oscillating function is performed, the current flows through the rectifier circuit and the load member D by way of the normal closed oscillation stopping switch 29. Namely, when the oscillator circuit OC activates, the current flows by way of the diode 19, a secondary winding 11b of an oscillating transformer 11, base-emitter path of an oscillating transistor 12, the main storage capacitor 20 and the switch 29, and, at the same time, the current flows through the diode 19, the capacitor 16, the base-emitter path of the transistor 12, the main storage capacitor 20 and the switch 29. When the oscillation stopping switch 29 is opened, rectified output current from the rectifier circuit C is interrupted and thereby the transistor 12 is rendered swiftly non-conductive, because the feed-back current to the transistor 12 is switched off.

In the power supply arrangement shown in FIG. 9, an oscillation stopping circuit F is formed in between an oscillator circuit OC and a load circuit D. Namely, a normally closed oscillation stopping switch 29 is connected between a juncture located between a emitter electrode of an oscillating transistor 12 and an oscillating capacitor 13.

In accordance with the arrangement of FIG. 9, when the switch 30 is opened, the transistor is caused to cut-off and the oscillation of the oscillator circuit OC is ceased, as is in the case of the power supply arrangement of FIG. 8.

Figure 10:
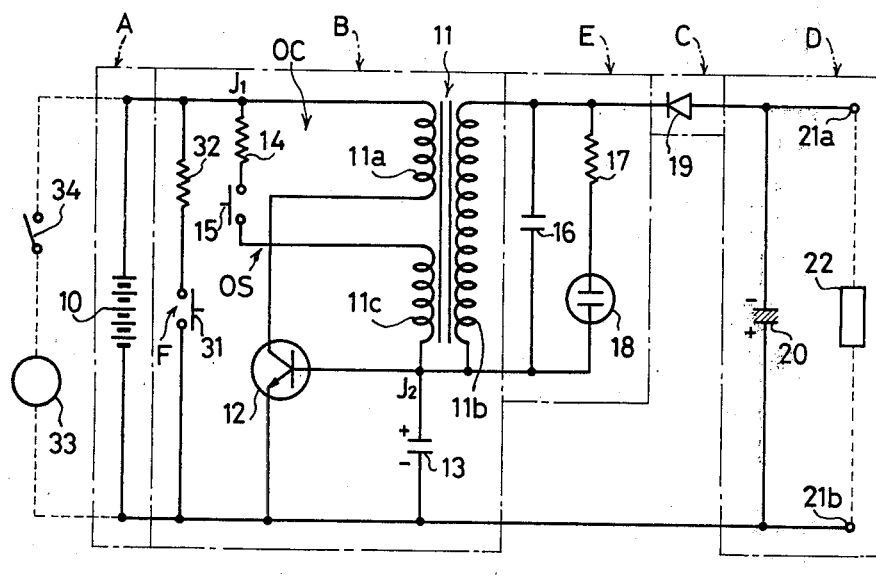
FIG. 10 is detailed circuit diagram of further power supply arrangement according to the present invention.

FIG. 10 shows one possible embodiment of the present invention. On the power supply arrangement shown in FIG. 10, an oscillation stopping circuit F is constructed by connecting an oscillation stopping switch 31 to a power source circuit A and a voltage converter circuit B. In more detail, a normal open switch 31 is connected to a battery 10 and the voltage converter circuit B by way of a large resistance value resistor 31.

In accordance with the power supply arrangement of FIG. 10, an input of the voltage converter circuit B is interrupted by momentary closing the switch 31, and, therefore, activation of the voltage converter circuit B is stopped because the primary current of an oscillating transformer 11 is not supplied from the battery 10. More specifically, when the switch 31 is momentary closed during the oscillator circuit OC activates its operation, the base current of the transistor 12 becomes zero and the oscillation of the oscillator circuit OC is ceased by the nonconductive state of the transistor 12.

According to the power supply arrangement of FIG. 10, when other load arrangement consisting of such as, for example, an electric motor 33 is connected to a power source circuit A through a switch 34 and in common with the load circuit member D, as is shown by a dotted line, the only voltage converter circuit B may be made OFF state by closure of the switch 31 without rendering the motor 33 OFF.

According to the present invention, the following advantages are obtained;

Since the function of a voltage converter circuit may be automatically stopped after current is supplied to a load by momentary supplying an oscillation starting signal, a power source switch is unnecessary and an useful consumption of a power source owing to leave the power source switch to turn OFF.

Since activation of a voltage converter circuit may be started by momentary supplying an oscillation starting signal to an oscillator circuit and thereafter the activation of the voltage converter circuit may be stopped by supplying an oscillation stopping signal to the voltage converter circuit, circuit construction is extremely simplified than that of the prior art power supply arrangement.

Since a simple construction push-button switches can be employed as an oscillation starting switch and an oscillation stopping switch, operation is simplified and enhanced, as well as the enhancement of the frequent operation of the switches.

In view of the above, it will be seen that the several objects of the invention are achived and other advantageous results attained.

While preferred embodiments of the invention have been shown and described, it will be apparent to those skilled in the art that modifications can be made without departing from the principle and spirit of the invention, the scope of which is defined in the appended claims. Accordingly, the foregoing embodiments are to be considered illustrative, rather than restricting of the invention and those modifications which come within the meaning and range of equivalency of the claims are to be included herein.

What is claimed is:

1. In a power supply arrangement, comprising:
   a direct current power source circuit including a battery and providing a direct current;
   converter circuit means for converting said direct current from said direct current power source circuit to an alternating current voltage;
   a rectifier circuit for rectifying the alternating current voltage from said converter circuit means; and
   a load circuit member for receiving a current supply from said battery to said load circuit member;
   said converter circuit means comprising an oscillating transformer connected to said power source circuit and having a current flowing therethrough, an oscillator circuit for performing an oscillation operation and including an oscillation switching element for switching said current flowing through said oscillating transformer and functioning as a high resistance when said oscillating operation of said oscillator circuit ceases, and an oscillation starting circuit for activating said oscillation switching element of the oscillator circuit;
   said switching element (12) having a control electrode responsive to a control voltage and having a high resistance when deenergized so as to perform substantially as a power switch between said battery and said load circuit member, oscillation stopping means actuable to a given state for stopping the oscillation of said oscilator circuit by lowering the control voltage from said transformer applied to said switching element, and said oscillator stopping means including switching means (23-31) for inhibiting the oscillation of said oscillator circuit by making the control voltage applied to said control electrode at least that voltage from said oscillation starting means after activation of said oscillation stopping means and deactivation of said switching element thereby to quickly stop said oscillation.

2. In the power supply arrangement as claimed in claim 1, wherein said arrangement comprises an oscillating capacitor in parallel with said switching means so that, when said oscillation switching means is actuated to said given state, said oscillating capacitor is short-circuited.

3. In the power supply arrangement as claimed in claim 2, wherein said load circuit member includes a storage capacitor which is arranged to be fed from said transformer by way of said rectifier circuit, said oscillation starting circuit including an oscillation starting switch which is operative to couple power from the battery at least momentarily to the oscillating transformer so as to initiate oscillations, said oscillations being sustained by means of current flowing in the oscillating transformer until said current flowing in said oscillating transformer is reduced, by the storage of charge in the capacitor and action of the rectifier circuit, to a current flow which is sufficient to render conductive said oscillation switching element having high leakage resistance.

4. In the power supply arrangement as claimed in claim 3, wherein said switching means comprises a normally open switch which is actuated to said given state by being closed.

5. The power supply arrangement as claimed in claim 2, wherein said oscillating transformer has a third winding, and said switching means includes a normally open switch connected in parallel to the third winding of said oscillating transformer.

6. The power supply arrangement as claimed in claim 2, wherein said oscillating transformer has a secondary winding, and said switching means for stopping the current supply from said battery to said load circuit member includes a normally closed switch connected to the secondary winding of said oscillating transformer in series relationship thereto.

7. The power supply arrangement as claimed in claim 2, wherein said oscillating transformer has a secondary winding, and said switching means for stopping the current supply from said battery to said load circuit member includes a normally open switch connected to said secondary winding of the oscillating transformer in parallel relationship thereto.

8. In the power supply arrangement as claimed in claim 1, wherein said oscillating transformer and said load circuit member form a current loop, said switching means interrupting current flowing in said current loop when not in said given state.

9. In the power supply arrangement as claimed in claim 8, wherein said oscillating transformer has at least a primary winding arranged for connection across the direct current power source circuit and a secondary winding.

10. In the power supply arrangement as claimed in claim 9, wherein said oscillation starting circuit further comprises a third winding connected to said oscillation starting circuit.

11. In the power supply arrangement as claimed in claim 10, wherein said oscillation switching element comprises a silicon transistor having high leakage resistance, and having a collector electrode connected to the primary winding of said oscillating transformer and a base electrode connected to the third winding.

12. In the power supply arrangement as claimed in claim 10, wherein said oscillation switching element comprises a silicon transistor having high leakage resistance, and having a collector electrode connected to the primary winding of said oscillating transformer and a base electrode connected to the secondary winding.

13. The power supply arrangement as claimed in any one of claims 11 and 12, wherein said switching means for stopping the current supply from said battery to said load circuit member comprises a normally closed switch connected between the base electrode and one of the second winding and the third winding of said oscillating transformer.

14. In the power supply arrangement as claimed in claim 9, further comprising a surge absorbing circuit connected in parallel with said secondary winding of the oscillating transformer.

15. In the power supply arrangement as claimed in claim 8, wherein said load circuit member includes a main storage capacitor.

16. In the power supply arrangement as claimed in claim 1, wherein said oscillation starting circuit includes a normally open switch adapted to be placed in an ON state at least instantaneously.

17. In the power supply arrangement as claimed in claim 16, wherein said oscillation starting circuit includes a resistor connected in series with said oscillation starting switch.

18. In the power supply arrangement as claimed in claim 16, wherein said oscillation starting circuit further includes an oscillation starting capacitor connected to a base electrode of the oscillation switch element.

19. The power supply arrangement as claimed in claim 1, wherein said rectifier circuit includes a negative terminal, said switching means comprising a normally closed switch connected to said negative terminal of said rectifier circuit.

20. The power supply arrangement as claimed in claim 1, wherein said rectifier circuit has a positive electrode side, and said switching means includes a normally closed switch connected between said load circuit member and said positive electrode side of said rectifier circuit.

21. The power supply arrangement as claimed in claim 1, wherein said voltage converter circuit means includes a direct current voltage input side, and wherein said switching means circuit is provided in said direct current voltage input side of said voltage converter circuit.

22. The power supply arrangement as claimed in claim 21, wherein said switching means includes a normally open switch connected in parallel with the battery of said direct current power source circuit.

23. In the power supply arrangement as claimed in claim 1, further comprising an indicating circuit including an indicating lamp which illuminates when the oscillator circuit is activated to perform an oscillation operation.

* * * * *

UNITED STATES PATENT AND TRADEMARK OFFICE
CERTIFICATE OF CORRECTION

PATENT NO. : 4,385,347

DATED : May 24, 1983

INVENTOR(S) : Yoshiyuki Takematsu

It is certified that error appears in the above-identified patent and that said Letters Patent is hereby corrected as shown below:

Column 10, line 59, change "lowering" to --adjusting--;
line 61, after "element", insert --to a deactivating level--;
line 62, delete "(23-21)";
line 63, change "oscillation" to --re-oscillation--, and after "circuit", insert --for a predetermined time period--;
line 64, change "making" to --maintaining--;
line 65, change "least that voltage from" to --said deactivation level such that--; and
line 66, after "means", insert --is not activated--.

Column 11, lines 3-6, delete "so that, when said oscillation means is actuated to said given state, said oscillation capacitor is short-circuited" and insert --and said oscillation stopping means comprises a switch element connected between said control electrode and a ground reference which, when switched to said given state, effectively short circuits said capacitor--;
line 32, change "2" to --1--; and
lines 42-44, delete "connected to the secondary winding of said oscillating transformer in parallel relationship thereto" and insert --for applying the voltage from a high-voltage side of said oscillating transformer to the control electrode of said switching element--.

UNITED STATES PATENT AND TRADEMARK OFFICE
CERTIFICATE OF CORRECTION

PATENT NO. : 4,385,347

DATED : May 24, 1983

INVENTOR(S) : Yoshiyuki Takematsu

It is certified that error appears in the above-identified patent and that said Letters Patent is hereby corrected as shown below:

Column 11, line 8, change "2" to --1--;
           line 23, change "3" to --1--; and
           line 32, change "2" to --1--.
Column 12, line 26, change "instantaneously" to --temporarily-- and
           line 48, delete "voltage".

Signed and Sealed this

Twenty-first Day of February 1984

[SEAL]

Attest:

GERALD J. MOSSINGHOFF

Attesting Officer    Commissioner of Patents and Trademarks